Nov. 21, 1933.　　W. W. SMITH　　1,935,674
SCALE BEAM GAUGE
Filed May 5, 1931　　3 Sheets-Sheet 1
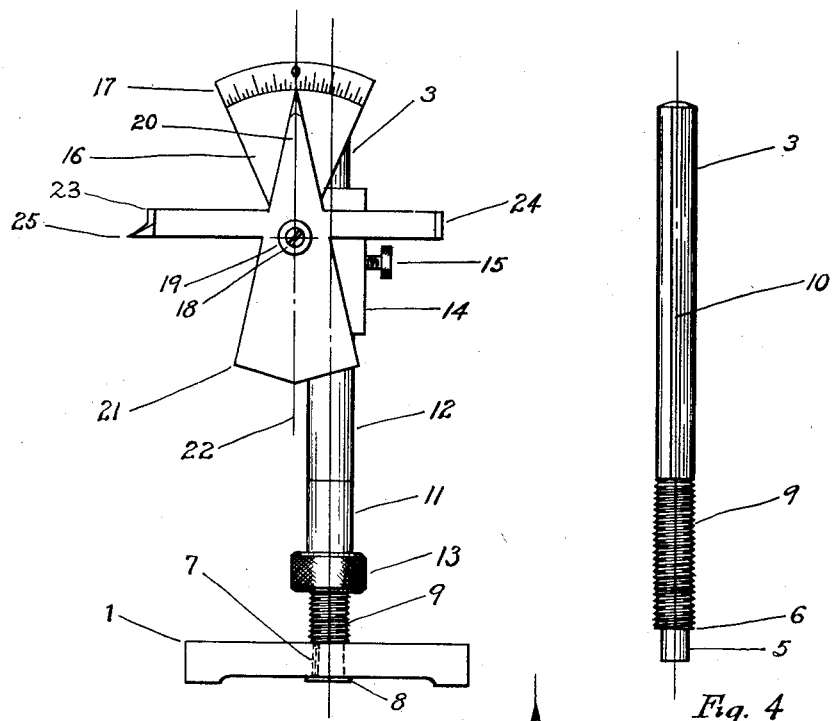
Fig. 1
Fig. 4
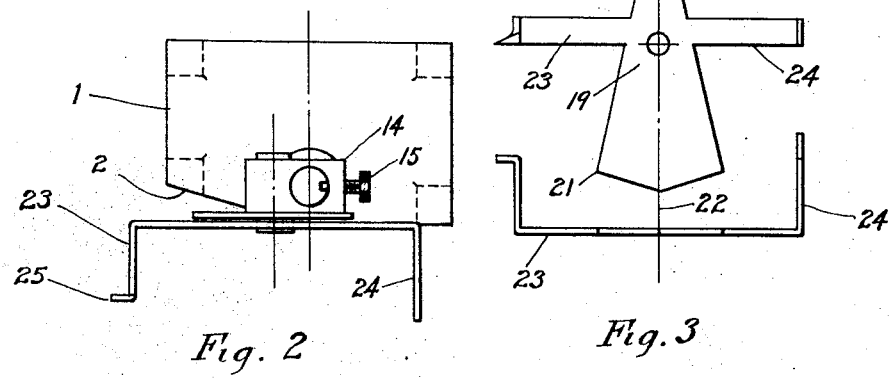
Fig. 2　　Fig. 3
Inventor
WILLIAM WINFIELD SMITH
By Paul P. Stoutenburgh
Attorney Nov. 21, 1933.   W. W. SMITH   1,935,674
SCALE BEAM GAUGE
Filed May 5, 1931   3 Sheets-Sheet 2

Inventor
WILLIAM WINFIELD SMITH
By Paul P. Stoutenburgh
Attorney

Nov. 21, 1933. W. W. SMITH 1,935,674
SCALE BEAM GAUGE
Filed May 5, 1931 3 Sheets-Sheet 3

Inventor
WILLIAM WINFIELD SMITH
By Paul P. Stoutenburgh
Attorney

Patented Nov. 21, 1933

1,935,674

UNITED STATES PATENT OFFICE 1,935,674

SCALE BEAM GAUGE

William Winfield Smith, Harriman, Tenn.

Application May 5, 1931. Serial No. 535,160

7 Claims. (Cl. 33—206)

(Granted under the act of March 3, 1883, as amended April 30, 1928; 370 O. G. 757)

The invention described herein may be manufactured and used by or for the Government of the United States for governmental purposes without the payment to me of any royalty thereon.

My invention relates to gauges for scale beams of any of the standard beam type weighing scales, and more particularly to those types of beams now employed by the U. S. Postal Service for weighing mail and generally known as the 9-ounce and 4-pound beam scales.

The specifications of the U. S. Post Office Department for scales require that the beams balance at a horizontal position and move to substantially equal distances from the horizontal position of rest within fairly narrow limits.

Prior to my invention the method of inspecting a scale beam has been to employ a ruler or surface gauge to measure the height of the beam near the scale and at the tip thereof. When the beam has been placed in this position the beam is then moved to its upper limit and its height from the table or support determined and then the beam has been moved to the lower position and its height determined. By this method a great amount of time was consumed in making an accurate inspection of the scales purchased.

By my improved scale beam gauge the horizontal position of the scale beam is ascertained, the upper and lower limits of movement of the scale beam ascertained and the scale beam centered in balance in its horizontal position by the use of but one instrument and without computation; the object of my invention being accuracy and speed in determining these features.

Other objects will become apparent as the description of my invention is developed with reference to the accompanying drawings, in which—

Figure 1 is a detail elevational view of the preferred form of my scale beam gauge.

Figure 2 is a plan view thereof.

Figure 3 is a detail view of the pendulous indicating member of my scale beam gauge.

Figure 4 is a detail view of the post thereof.

Figure 5:
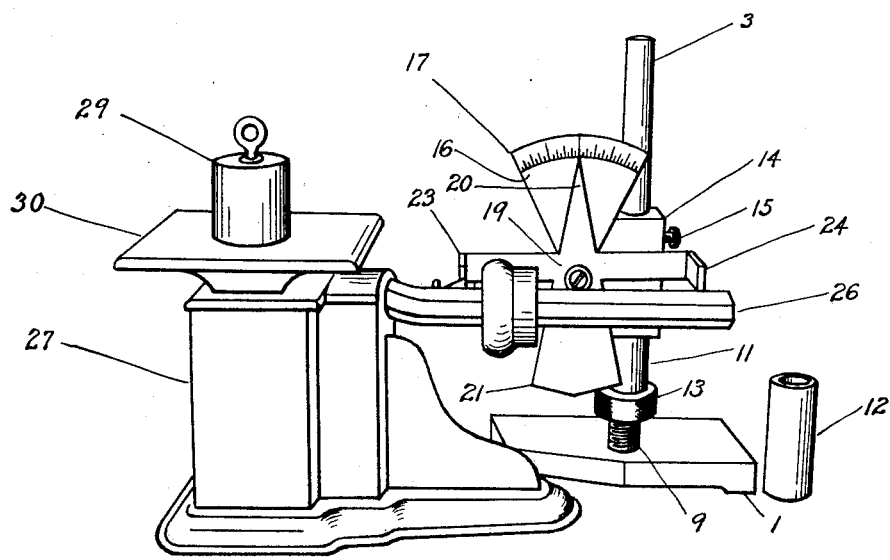
Figure 5 is a view in elevation of my scale beam gauge positioned to determine the horizontal position of the scale.

Referring particularly to Figures 1 and 2, I provide a base 1 generally rectangular in form, but with one corner thereof beveled off as indicated at 2. In this base at one side thereof, but on a medial line with respect to the other dimension of the base, I have drilled a smooth bored hole into which is mounted the post 3, shown in detail in Figure 4. This post is provided with a stem 5 of slightly smaller diameter than the main portion of the post so that a shoulder is formed at 6. The stem 5 forms a snug fit in the hole in the base 1. To prevent the post 3 from turning in the base 1, a dowel-pin is drilled into the base 1 and stem 5 of the post 3. The post 3 and the dowel-pin 7 are held securely in the base by means of a screw 8. The lower portion of the post 3 is provided with threads, as indicated at 9. The rest of the post is smooth-surfaced with a land 10 running lengthwise of the same.

Upon the post are slidably mounted two spacing members 11 and 12 which are adjusted in position by means of a thumb-nut 13 engaging the threaded portion 9 of the post. Above the spacing members 11 and 12 I have slidably mounted a support 14 which is prevented from rotating about the post by means of a set-screw 15 which engages in the land 10 of the post 3. Upon this support 14 there is mounted a segment 16 of an indicator dial, the upper portion of which is calibrated as shown at 17. At the center of the indicator dial I have provided a pivot 18 which carries a pendulous indicating member 19 shown in detail in Figure 3.

Figure 6:
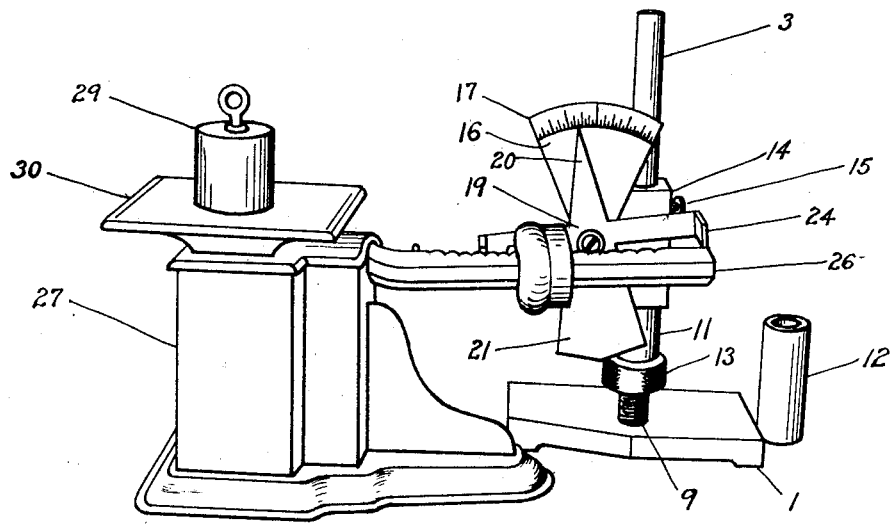
Figures 6 and 7 are elevational views of my scale beam gauge when used to determine the upper and lower limits of movement of the scale beam, and, Figure 8 is an elevational view of my scale beam gauge when used as an index.
Figure 7:
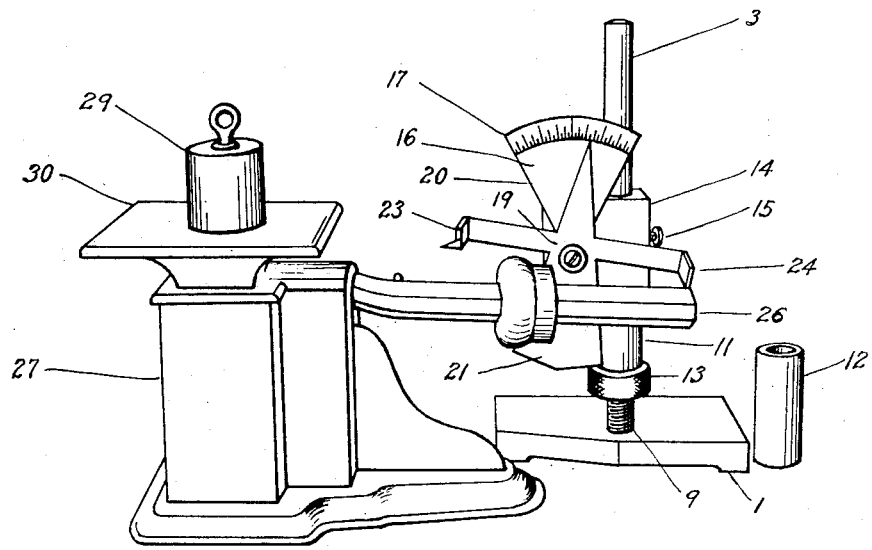
Figure 8:
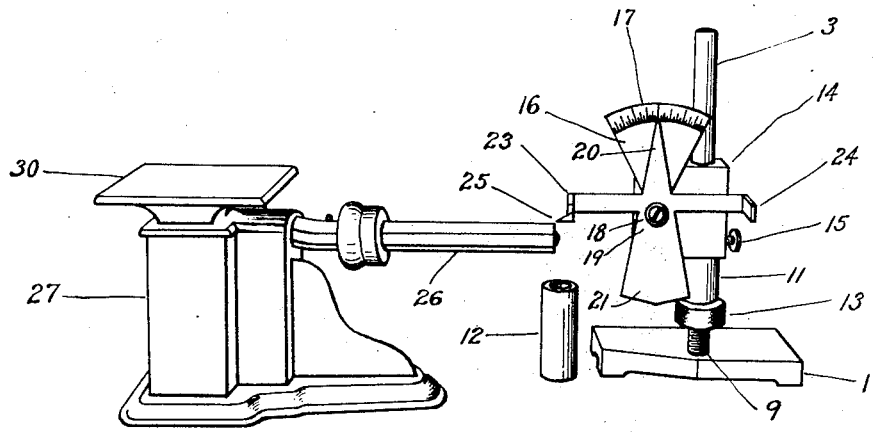

This pendulous member consists of an indicator 20 and a bob-portion 21. At right angles to the medial line 22 of the indicator and bob-portion I have provided two arms 23 and 24 which are adapted to engage the beam of the scale as indicated in Figures 6, 7 and 8. The arm 23 is provided with a finger 25.

When my improved scale beam gauge is assembled as shown in Figure 1 and rests upon a horizontal plane, the indicator 20 registers "zero" upon the calibrated portion 17, the medial line of the indicating member being vertical due to its pendulous feature.

The operation of my device is as follows:

When it is desired to adjust the beam 26 of a 9 ounce or 4 pound postal scale as indicated at 27 in Figures 5, 6, 7 and 8, my scale beam gauge is positioned as shown in Figure 5, the proper spacing element 11—12 being chosen for the particular scale to be adjusted. A weight 29 is placed upon the pan 30 of the scale so that the beam 26 rests immediately below the arms 23 and 24 of the pendulous indicating member 19. The thumb-nut 13 is then adjusted until the indicator 20 registers opposite "zero" on the calibrated portion 17 of the segmental indicator dial 16.

The scale beam 26 is then moved to a position such as shown in Figure 6, the beam 26 of the postal scale engaging only the arm 24 of the pendulous indicating member 19. The beam 26 is then moved to its raised position as indicated in Figure 6 and the reading on the calibrated segmental indicator dial 16 is noted. The beam 26 is then depressed to its lower limit as shown in Figure 7 and the reading of the indicator 20 is again noted. These two readings should be substantially the same to comply with the requirements of the Postal Service.

To adjust the beam 26 of the postal scale 27 so that its position of rest is horizontal, the scale beam gauge is then moved to the position shown in Figure 8 and the balancing means of scale 27 is adjusted so that the tip of the beam 26 coincides with the finger 25 on the arm 23 of the pendulous indicating member 19. The finger 25 is maintained at the proper level due to the pendulous feature of the bob-portion 21 of the indicating member 19.

From the foregoing it will be seen that in one instrument I have provided a means for ascertaining the horizontal position of a beam of a postal scale, means for ascertaining whether the upper and lower limits of movement of the scale beam are equal in extent from the position of rest thereof, and means for adjusting the scale so that the position of rest of the beam will be horizontal.

While I have illustrated my invention and described the same as embodied in a particular form and for a particular use, it is to be understood that various modifications thereof to adapt the same to different uses may be made without departing from the spirit of my invention as defined by the scope of the claims appended hereto.

Having thus described my invention, what I claim is as follows:

1. In a scale beam gauge, the combination of a base, a vertical post mounted thereon, a pendulous indicating member having means thereon adapted to engage the scale beam at a plurality of points and adjustably mounted upon said post and a segmental calibrated dial cooperating with said pendulous indicating member.

2. In a scale beam gauge, the combination of a base, a vertical post mounted therein, and an indicating unit adjustably mounted upon said post, said indicating unit comprising a support, a segmental calibrated dial carried by said support, and a pendulous indicating member pivotally mounted upon said support at the center of said segmental dial, and means upon said pendulous indicating member for engaging a scale beam at a plurality of points.

3. In a scale beam gauge, the combination of a base, a post vertically mounted thereon, and a pendulous indicating member adjustably mounted upon said post, said pendulous indicating member having arms normally seeking a horizontal position and adapted to engage a scale beam.

4. In an indicator for gauging scale beams, the combination of a support, a calibrated segmental dial carried by said support and a pendulous member, comprising a plurality of scale beam engaging arms normally seeking a horizontal position, pivotally mounted upon said support, said pendulous member carrying an indicator cooperating with the calibrations of said segmental dial.

5. In an indicator for gauging scale beams, the combination of a support, a calibrated segmental dial carried by said support, and a pendulous indicating member pivotally mounted at substantially the center of said segmental dial, said pendulous indicating member being provided with two arms adapted to engage a scale beam.

6. In an indicator for gauging scale beams, the combination of a support, a calibrated segmental dial carried by said support, and a pendulous indicating member pivotally mounted at substantially the center of said segmental dial, said pendulous indicating member being provided with two arms adapted to engage a scale beam, one of said arms being provided with a finger for indicating the horizontal position of the scale beam.

7. In an indicating unit, comprising a dial member, and a pendulous indicating member cooperatively pivoted thereon, said pendulous indicating member being provided with means for engaging a scale beam at a plurality of points.

WILLIAM WINFIELD SMITH.